July 24, 1962 W. M. DILLON 3,045,706
VALVE DEVICE INSERTABLE BETWEEN FLANGE FITTINGS
Filed Jan. 9, 1961 2 Sheets-Sheet 1
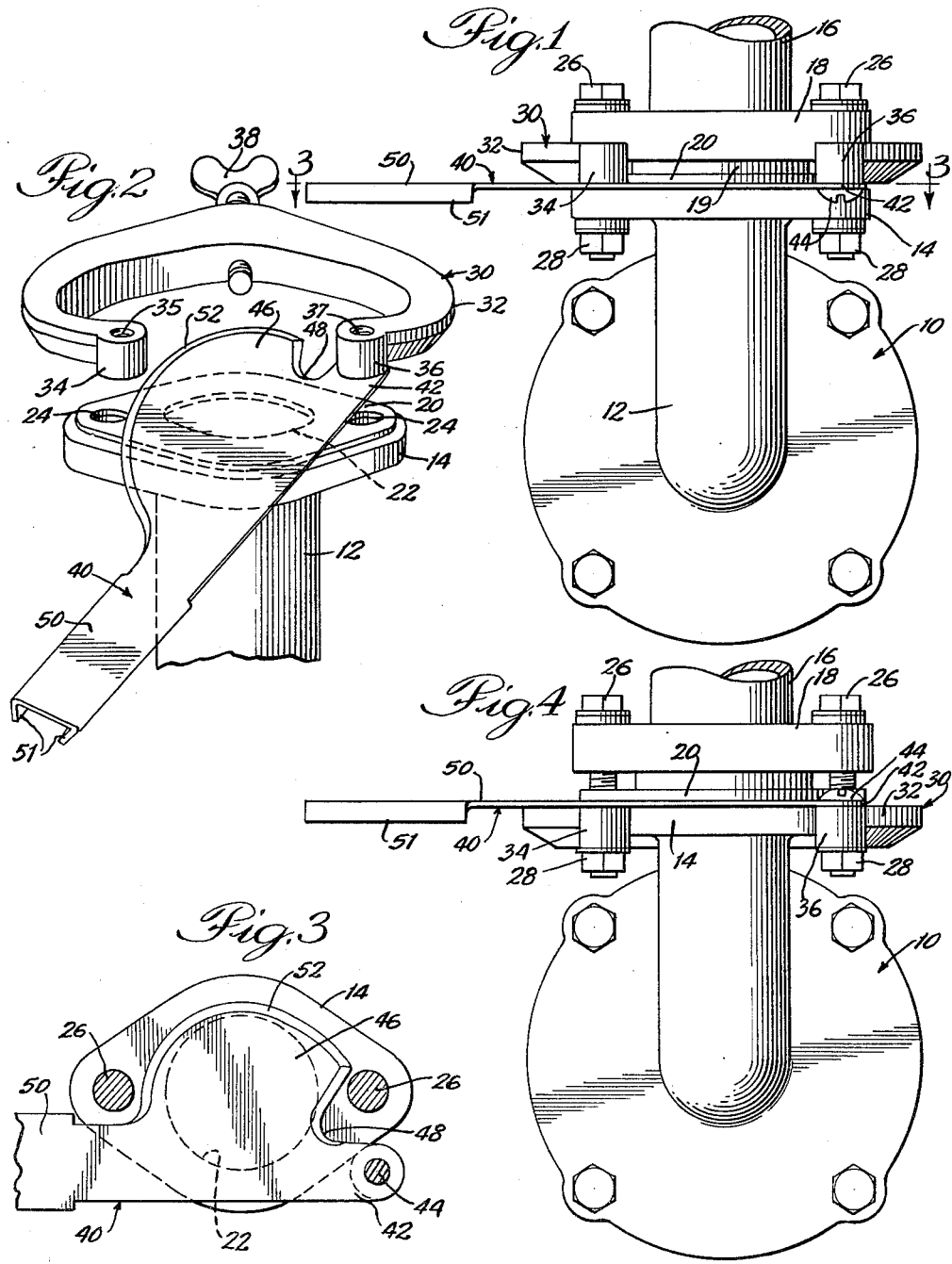
INVENTOR:
Wendell M. Dillon,
BY
Bair, Freeman & Molinare
ATTORNEYS.

July 24, 1962 W. M. DILLON 3,045,706
VALVE DEVICE INSERTABLE BETWEEN FLANGE FITTINGS
Filed Jan. 9, 1961 2 Sheets-Sheet 2
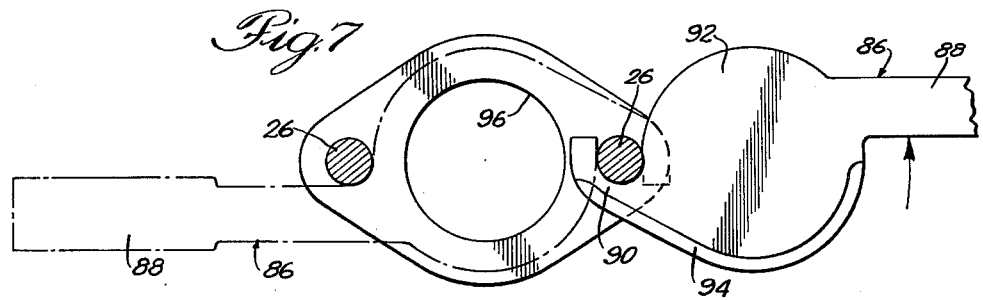
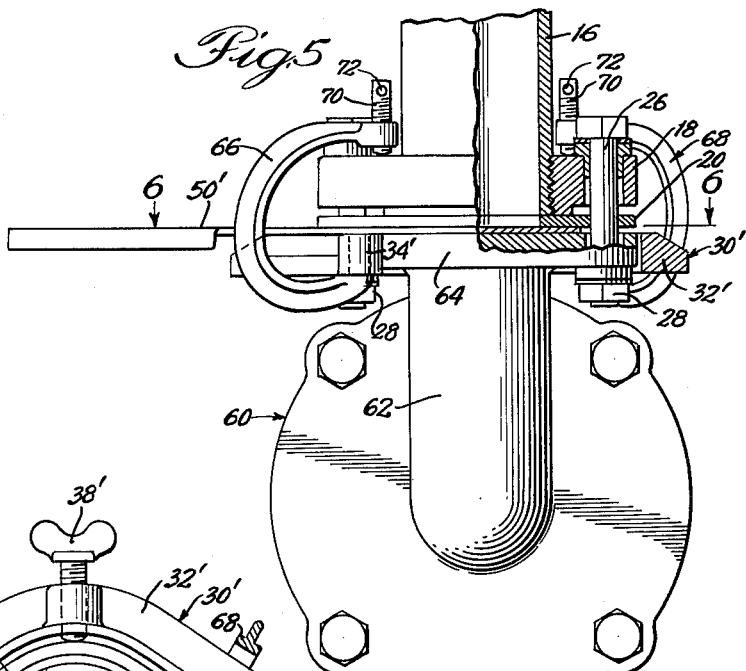
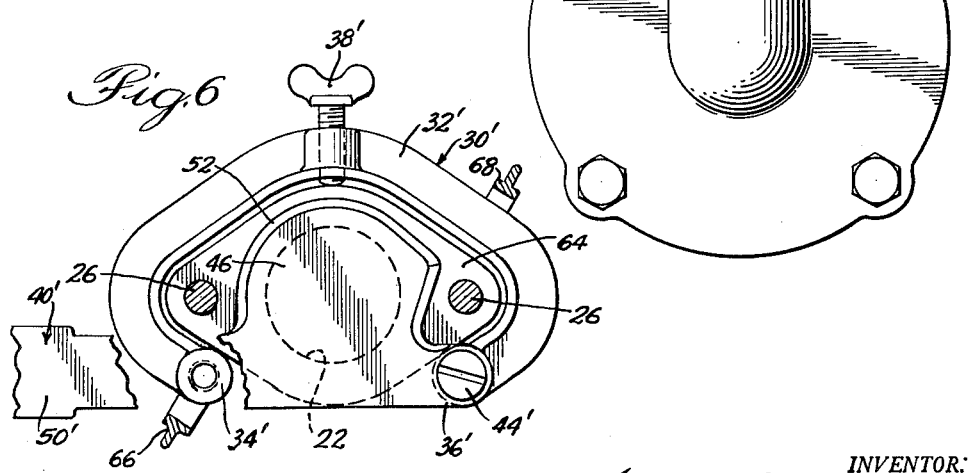
INVENTOR:
Wendell M. Dillon.
BY
Bair, Freeman & Molinare
ATTORNEYS.

United States Patent Office 3,045,706
Patented July 24, 1962

3,045,706
VALVE DEVICE INSERTABLE BETWEEN
FLANGE FITTINGS
Wendell M. Dillon, North Andover, Mass., assignor to Watts Regulator Company, Lawrence, Mass., a corporation of Massachusetts
Filed Jan. 9, 1961, Ser. No. 81,504
2 Claims. (Cl. 138—94.5)

This invention relates to a valve device insertable between connecting flanges and the like of a conduit, to control fluid flow therethrough. The invention is especially adapted for stopping fluid flow in a liquid circulating line to enable servicing of the circulator equipment mounted in the line.

Equipment is frequently installed in a line with no valves ahead of or behind the equipment, so that the line remains open for fluid flow to the equipment. When it is necessary to repair or replace such equipment, the system must be shut down, and frequently the system must be completely drained of fluid before service work on the equipment can commence. Thus, and for example, in the average hot water heating system, a circulator, or circulating pump, is usually installed without valves ahead of or behind the circulator. When it is necessary to repair or service the circulator, the casing or body usually is left in the line, and the motor, shaft, packing boxes and other parts are removed as a unit by unbolting this assembly from the casing. The assembly is repaired and replaced, or a new assembly is installed. To remove the assembly, it is necessary to open the drain valve in the system to release the water pressure. At times, a vacuum may be created to hold the water long enough for the parts to be removed and a new assembly inserted. However, the work frequently can not be done rapidly enough to avoid loss of water from the open casing, so that the system must be drained and subsequently refilled, which requires considerable time and becomes a costly operation.

It would be very desirable to provide a means for blocking a fluid conduit, while the aforementioned operations are conducted without loss of fluid, thus obviating the necessity for draining the system. It would also be advantageous if the complete circulator, or other equipment being repaired or serviced, could be completely removed from the line.

Accordingly, it is an object of the present invention to provide, in a device or tool, a means for blocking the fluid conduit from which a piece of equipment such as a circulator is to be removed for replacement or servicing.

Much of the equipment mounted in a fluid circuit, and including most liquid circulators, have flange mountings. These flanges are bolted to companion flange fittings on adjoining conduit sections. Both or one of the equipment flanges and the companion flanges may have flat faces, and a sealing gasket is inserted between the flanges.

It is, therefore, an important object of the invention to provide a valve device, or tool, which is insertable between flange fittings of a conduit or the like to control fluid flow therethrough and, in particular, to block the conduit while servicing the equipment in the line, while obviating the necessity for draining the system or taking other steps to contain the fluid.

A particular object is to provide a valve device which is arranged to connect to the flange fittings by which the equipment is mounted in the line.

Another particular object is to provide a valve device which is insertable between flange fittings sealed by a gasket.

An additional object is to provide a servicing device which is removably mountable on flange fittings of a conduit and which provides a valve plate member for insertion between the connecting flanges of a conduit to permit of servicing of a section of the conduit while retaining the fluid in the remainder of the conduit.

A further object is to provide a device which enables complete removal of a piece of equipment from the fluid conduit for replacement or servicing.

Additional objects include the provision of a construction which is easily and effectively operated, and which is simple and economical. These and other objects, advantages and functions of the invention will be apparent upon reference to the specification and to the accompanying drawings, in which like parts are identified by like reference symbols in each of the views, and in which:

FIGURE 1 is a side elevational view illustrating one form of the valve device of this invention in place on one of the mounting flanges of a conduit which connects to a circulator pump;

FIGURE 2 is an exploded perspective view of several parts of the assembly of FIGURE 1, particularly illustrating the valve device and illustrating the flange and gasket between which the valve plate member is to be inserted;

FIGURE 3 is a plan view of the valve plate member illustrating how it closes off the conduit, and is taken substantially on line 3—3 of FIGURE 1;

FIGURE 4 is a side elevational view similar to FIGURE 1, but illustrating the attachment of the valve device of FIGURES 1-3 to the mounting flange of a circulator pump;

FIGURE 5 is a side elevational and partly vertical cross-sectional view of another form of valve device wherein a valve plate member of the types shown in FIGURES 1-3, or FIGURE 4, may be utilized in combination with a means for clamping the valve plate member to one of the mounting flanges of a conduit;

FIGURE 6 is another view of the valve device of FIGURE 5 and is taken substantially on line 6—6 of FIGURE 5; and FIGURE 7 is a view similar to FIGURE 3, illustrating in full lines in plan view, a modified form of the device of this invention wherein there is included a modified valve plate member without the mounting frame, and FIGURE 7 also shows the conduit closing position of the modified valve plate in alternate position in dot-dash lines.

Referring now to the figures, there is illustrated in FIGURE 1 a typical installation which includes a circulator connected to a conduit. FIGURE 1 further shows the utilization of the tool of this invention with such an installation. More specifically, the circulator is indicated generally at 10, and the circulator has extending laterally therefrom a circulator tubular elbow, or conduit, 12 which turns upwardly and terminates at a connector flange 14. The conduit to which the circulator connects is indicated at 16, and said conduit terminates at its lower end in a connector flange 18 which is complementary to the connector flange 14. The flange 18 is provided with a downwardly extending annular boss 19, and a resilient sealing gasket 20 is positioned between the said flanges 18 and 14.

As best seen in FIGURE 2, the gasket 20 has a central aperture 22, in register with the flow passage of conduits 12 and 16, and a plurality of bolt holes 24 which align with the bolt holes in the respective flanges 14 and 18. In the normal installation, a plurality of elongated assembly bolts 26 extend through bolt holes in flanges 14 and 18, and nuts 28 cooperate with the bolts 26 to clamp the flanges together. This construction and other specific details thereof are well known in the art and need no further description here.

Now, the tool of this invention, one form of which is shown in FIGURES 1-3, is generally indicated at 30, and includes a C-shaped frame member 32 which is of a shape and dimension to easily fit over and encompass the greater portion of one of the flanges 14 or 18 to which the C-frame is to anchor, or connect. The ends of the C-frame are shaped to define enlargements 34 and 36 which are respectively bored at 35 and 37. The central portion of the C-frame 32 carries a manually selectively adjustable thumb screw 38, the inner end of which is adapted to engage the edge of a flange 14 or 18 to effect clamping, or anchoring, of the C-frame onto the said flange.

It will be understood that the minimum spacing between the enlargements 34 and 36 is greater than the size of conduits 16 or 12 which connect to the respective flanges 14 and 18. This permits the frame 32 to be moved laterally relative to the conduits to a position where it can be moved axially of one of the flanges into the plane of the flange so as to partially surround said flange, and then with the inwardly-extending portions of enlargements 34 and 36 bearing against the edge of the selected flange, and by tightening up on the thumb screw 38, a three-point engagement of the C-frame with the flange is effected, thereby mounting the tool in a selected position.

The tool 30 also includes a swingable plate generally indicated at 40, a portion of which is insertable between a pair of connector flanges to block the flow passageway or conduit. The plate 40 is shaped to define a connector portion 42 which pivots on a pivot bolt 44 that threads into, or is otherwise positioned in one of bores 35 or 37 in the respective enlargements on the C-frame. The plate 40 also defines an enlarged flat portion 46 with an arcuate leading edge, and said portion 46 is of a shape and dimension to completely block off the liquid flow passageway between the conduit sections 12 and 16. Because of the particular shape of enlarged portion 46 and the shape of connector portion 42, there is provided a recess 48 between said sections, as can be seen in the figures. The plate 40 is further shaped to define an elongated lever, or handle, 50 that extends generally radially of pivot bolt 44 and serves as means for swinging the plate portion 46 into and out of position between pairs of adjacent connector flanges. For ease in grasping, the edges 51 of the handle 50 may be folded or rolled inwardly. Alternatively, the handle 50 may be a flat part and hand-grip members may be appropriately bolted or secured thereto, as is well known in the art of handles.

The leading arcuate edge of the enlarged portion 46 is provided with a chamfer, or taper, 52 along its length, and this assists in initiating having the enlarged plate portion 46 enter between a connector flange and the adjacent sealing gasket without injuring the gasket or displacing the gasket laterally of its operative position. The chamfered edge 52 is at a slope of about 6° to 7° and may be provided on either side of portion 46.

In the use of tool 30, the C-frame 32 with plate 40 swung out of operative position is positioned adjacent the upper connector flange 18 and substantially in the plane of the flange 18, and with the sharp edge of the plate portion 46 aligned with the interface between the gasket 20 and the lower flange 14. The thumb nut 38 is then tightened to secure frame 32 to the flange 18. Then the bolts 26 are loosened, thereby relieving pressure on the gasket 20, and the handle 50 is swung to its operative position where the flat portion 46 of plate 40 enters between the gasket 20 and the flange 14 to the flow-interrupting position as seen in FIGURE 3, where the plate portion 46 overlies the entire flow passageway. The interposition of the plate portion 46 in the flow channel will limit further flow between the conduits 12 and 16. Then, by tightening up on the bolts 26, the parts are clamped in position with the plate portion abutting one connector flange and very little leakage will have occurred. Since the circulator 10 is now cut off from conduit 16, it is now possible to service the circulator 10. It is, of course, understood that since the circulator 10 has another connection at its other end, a similar tool is utilized at the other end of the circulator, so that the circulator is, in effect, isolated from the rest of the circulation system.

In the alternative construction shown in FIGURE 4, the plate 40 is so connected to the C-frame 32 that the C-frame 32 is connected to the lower flange 14, while the flat, flow-blocking, portion 46 of the plate 40 is above the frame 32 and is adapted to be inserted between the gasket 20 and the same flange 14. This contrasts with the form of construction shown in FIGURES 1–3, wherein the C-frame 32 connects to one of the flanges 18 while the flow-blocking plate 46 is below frame 32 and is positioned so that it enters between the other flange 14 and the gasket 20.

The device shown in FIGURES 5 and 6 is a modification of the invention hereinabove described and shows a system wherein the flow-blocking plate of the tool may be so secured to a conduit as to permit complete removal of the circulator from the system for servicing or replacement. It will be observed that in the use of the tools of FIGURES 1–4, the bolts 28 are relied upon to prevent separation of the connector flanges and to prevent leakage. In the system of FIGURES 5 and 6, the use of the connector bolts is no longer required. In FIGURES 5 and 6 the circulator to be removed from the system is generally indicated at 60, and it includes a circulator tubular elbow, or conduit, 62 which terminates at its upper end in a connector flange 64. The conduit to which the circulator connects is shown at 16 and terminates at its lower end in a connector flange 18 that is complementary to the flange 64. In this form of the device, the tool is generally indicated at 30′ and includes a C-frame 32′, having end enlargements 34′ and 36′, and carrying a selectively adjustable thumb screw 38′. The swingable plate 40′ is shaped to define a connector portion 42′ which pivots on a pivot bolt 44′ that may be secured by threading, or the like, in the bore in one of said enlargements. Again, the plate 40′ is shaped to define a flow-blocking, flat, portion 46′ which, when swung to operative position is interposed in the flow passageway between the conduits. The plate is provided with a manual operating handle 50′.

In order to secure the C-frame 32′ to the connector flange 18, there are provided a plurality of clamps of modified C-shape, generally indicated at 66 and 68. Two of such clamps are shown in FIGURES 5 and 6 and they are arranged generally diametrically of the center of the flow passageway. The shape and dimension of the clamps 66 and 68 are selected relative to the parts to be engaged so that the lower jaw of each of clamps 66 and 68 is positioned to engage the underside of the C-frame 32′, as best seen in FIGURE 5, and then the upper portion of each clamp 66 and 68 extends radially inwardly a greater distance than the lower jaw portions of the clamps, to a position where the upper jaws overlie the connector flange 18 of the conduit 16. The upper jaw portion of each clamp 66 and 68 carries a screwthreaded clamping pin 70 which may, for convenience, be provided with a slidably mounted actuating handle, or lever, 72. The manipulation of pins 70 provides means for clamping the tool 30′ onto the connector flange 18.

The clamps 66 and 68 are applied after the plate 40′ has been swung to the position where it has been interposed in the fluid passageway. With the plate 40′ positioned to block the opening at the lower terminus of conduit 16, and with frame 32′ below plate 40′, the clamps 66 and 68 engaging the upper, or rear, side of flange 18 cooperate to hold both the C-frame 32′ and the plate 40′ in position on the flange 18 with plate 40′ between frame 32′ and flange 18. After the C-frame 32′ is so clamped in position, the thumb screw 38′ may be backed off from engagement with the flange 64 on the circulator and, by removal of the assembly bolts 26, the adjacent end of the circulator 60 is rendered completely free. By utilizing a similar tool and clamps on the conduit which connects to the other end of the circulator, it is possible to completely release the circulator from the system to permit extensive repairing of the circulator or installation of a wholly new circulator. At the same time, there is relatively little loss of fluid from the circulation system.

In still another modified form of the device shown in FIGURE 7, there is illustrated a simpler form of device embodying many of the features of the invention herein. FIGURE 7 illustrates at 80 one of a pair of connector flanges through which extend a plurality of clamping bolts 82 and 83 and against which is positioned a sealing gasket 84. The tool for interposition in the flow passageway is shown generally at 86 and includes an elongated handle 88 formed at one end of the device, a connector hook means 90 formed at the other end of the device, and an enlarged flow-blocking plate portion 92 between the handle 88 and hook 90. The flow-blocking portion 92 is provided with an arcuate chamfered edge 94.

In the use of the device of FIGURE 7, the clamping bolts 82 are loosened and the hook portion 90 of the plate tool 86 is entered between the adjacent connector flanges and at the interface between the gasket 84 and the connector flange 80. The hook 90 is manipulated to engage the shank of bolt 82 which thereafter serves as a fulcrum or pivot. Then the handle 88 is used as means for swinging plate portion 92 into and out of position between the flanges. When the flow-blocking portion 92 is swung into the position shown in dot-dash lines, as seen in FIGURE 7, it serves to block off the flow passageway 96. With a pair of these tools in position at the ends of the circulator, it is possible to effect repairs on and servicing of the circulator without appreciable loss of fluid from the system.

It will be seen that the engagement of the handle 88 with the other mounting bolt 83 serves to position the flow-blocking portion 92 at the desired location.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States is:

1. A valve device insertable between connecting flanges on a conduit to control fluid flow therethrough, said valve device comprising a plate insertable between said flanges to block said conduit, a generally C-shaped frame mountable to partly surround a flange, means for clamping said frame to said flange, and pivot means connecting said plate and said frame adapted for swinging said plate into and out of said position between said flanges.

2. A valve device insertable between connecting flanges on a conduit to control fluid flow therethrough, said valve device comprising a plate insertable between said flanges to block said conduit, a chamfered leading edge on said plate with which to initiate insertion of the plate between said flanges, a generally C-shaped frame mountable to partly surround a flange, pivot means on said frame adjacent each extremity thereof, and means pivotally connecting said plate to said frame pivot means adjacent either extremity of said frame.

References Cited in the file of this patent

UNITED STATES PATENTS

| | | |
|---|---|---|
| 1,148,617 | Pelton | Aug. 3, 1915 |
| 1,656,280 | Lalor | Jan. 17, 1928 |
| 2,225,153 | Brown | Dec. 17, 1940 |
| 2,732,170 | Shand | Jan. 24, 1956 |